Nov. 6, 1956 M. ARTZT 2,769,856

MULTIPLEX FACSIMILE SYSTEM

Filed May 13, 1950 4 Sheets-Sheet 1

INVENTOR
Maurice Artzt
BY
George T. Craig
ATTORNEY

INVENTOR
Maurice Artzt
BY George T. Craig
ATTORNEY

Nov. 6, 1956 M. ARTZT 2,769,856

MULTIPLEX FACSIMILE SYSTEM

Filed May 13, 1950 4 Sheets-Sheet 3

INVENTOR
Maurice Artzt
BY George J. Craig
ATTORNEY

MULTIPLEX FACSIMILE SYSTEM

Filed May 13, 1950 4 Sheets-Sheet 4

INVENTOR
Maurice Artzt
BY
George T. Craig
ATTORNEY

United States Patent Office 2,769,856

Patented Nov. 6, 1956

2,769,856

MULTIPLEX FACSIMILE SYSTEM

Maurice Artzt, Princeton, N. J., assignor to Radio Corporation of America, a corporation of Delaware Application May 13, 1950, Serial No. 161,887

4 Claims. (Cl. 178—6.6)

This invention bears on facsimile systems, namely, but not exclusively, on the aspect of this subject as it concerns multiplex transmission and reception of subject matter in facsimile.

Transmission of facsimile signals at a high speed presents special recording problems. Photographic recording may be used but it has certain inherent disadvantages. For chemical recording, recorder parts must move at such high speed that design and production of the recorder is almost impossible. By this invention means are provided for generating more than one series of facsimile signals upon scanning a single piece of subject matter. Each series is sent over a separate channel. The sum of the bandwidths of all channels, including guard bands and unused channel portions, is about the same as the bandwidth of the single channel which would be used to transmit the subject matter at the same speed. The recording speed per channel when the invention is used permits good mechanical design of the recorder. In a system using this invention a novel multiple helix recorder is provided having a common printer bar. Means are present to prevent inter-channel interference by limiting voltage surges in each printer helix. Electrical delay lines are used to compensate for mechanical or electrical mismatching in the system. The delay lines are used after signal detection so that all delay lines become the same bandwidth regardless of carrier frequencies used in each channel. Mechanical inaccuracies in the recorder are readily compensated for by the delay lines. Change of transmission speed without altering synchronism or phasing is possible with the invention.

The principal aim of the invention is to obtain high speed facsimile transmission and overcome disadvantages associated with high speed prior art transmission.

Another aim of the invention is the realization of the advantages pointed out above.

Other objects will be seen by reading this specification which refers to the drawing in which.

Figures 1, 2, 3, 4, 5, 6:
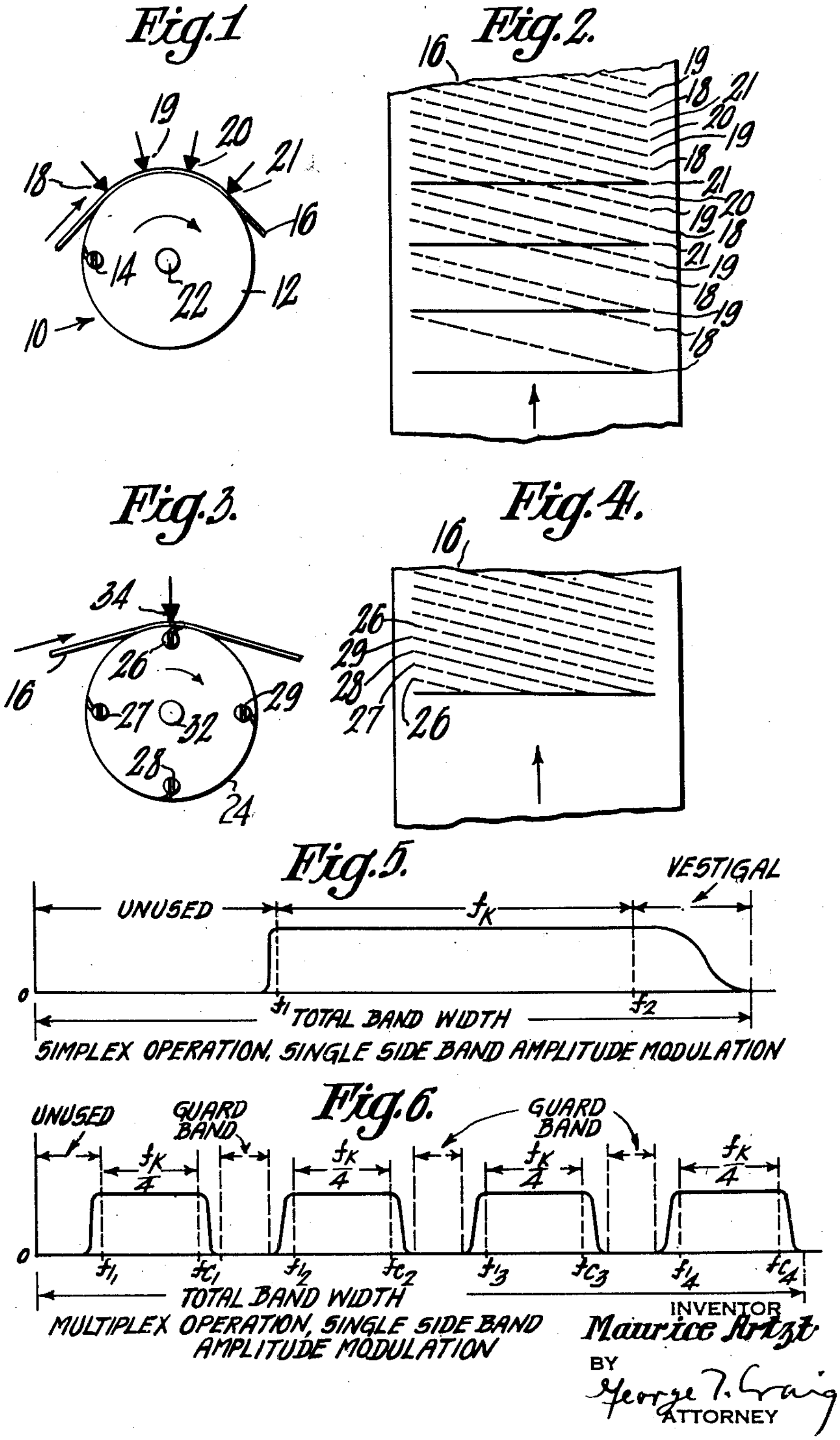
Figure 1 is a schematic showing of a recorder embodying the invention.
Figure 2 is a developed view of the recording of Figure 1.
Figure 3 is a schematic showing of a preferred type of recorder embodying the invention.
Figure 4 is a developed view of the recording of Figure 3.
Figure 5 is a curve showing a total bandwidth required for a high speed facsimile operation by prior art methods.
Figure 6 shows the total spectrum and manner of its use for high speed facsimile operation in accordance with the invention.

Figures 1 and 3 of the drawings show recorders for use in a system of the invention. The recorder of Fig. 1 is designated by the reference character 10 and includes a drum 12 having a single helix 14 secured thereon. A recording web 16 passes over the drum and is moved by a suitable means (not shown) in the direction of the arrow. The recorder of Fig. 1 is to be employed with the four transmission channels and four printer bars 18 to 21 as indicated. The drum is carried by a shaft 22 which is driven for rotation by any suitable means. Fig. 2 shows the web 16 with a recording pattern developed thereon. Fig. 2 shows the way in which the scanning lines are produced on the web 16 to form copy having interlaced lines.

The printer bars 18 to 21 must be exactly parallel to each other and to the drum axis. The spacing between them must be very exact for the lines to interlace correctly as shown in Fig. 2. As all of the printer bars are insulated from each other to carry the separate printing currents, they must be spaced apart. Optimum spacing is ⅓ of an inch. At least one inch of copy must pass through the recorder before the complete four-line interlace scanning pattern is obtained over the entire surface. Loss of time is thus encountered at the start of each subject.

Fig. 3 shows a preferred arrangement for a recorder. The recording web 16 is moving in the direction of the arrow tangent to a drum 24. Four helices 26 to 29 are equally spaced around the periphery of the drum. Each helix is insulated from the drum and has a slip ring connection as indicated on Fig. 7. The drum 24 is carried and driven by a shaft 32. A single printer bar 34 is disposed parallel to the axis of the drum 24. The printer bar 34 is common to all four channels. Accurate spacing of the helices on the drum 24 is desirable. An advantage of the arrangement of Fig. 3 is that small errors in angular spacing can be corrected by variable time delays inserted in the signal channels. As an example, it will be assumed that the angle between 26 and 27 and between 27 and 28 is 90°, the angle between 28 and 29 is slightly less than 90°, and the angle between 29 and 26 is slightly greater. On Fig. 4 scanning lines 26, 27 and 28 would be printed in correct positions. Line 29 would be printed slightly in advance of its true position. Signals to helix 29 could be delayed the correct amount to make line 29 print in its true position without mechanically moving the helix 29 into its proper place. Manufacturing tolerances are much easier to meet in view of this advantage.

Fig. 5 shows the total bandwidth required for simplex high speed operation. In order to carry the D. C. component of the video signal, they are transmitted as a modulation on a carrier. This carrier must be higher than the highest video frequency encountered. Even with single side band amplitude modulation, a use ratio much higher than 0.5 is seldom obtained. For example, a 192 kc. channel will accommodate a recording speed of 667 sq. in. per minute with 120 lines per inch detail. Fig. 5 shows the unused lower portion of the band in simplex operation. In the given example, this is 72 kc. Fig. 6 shows how this unused lower portion of the band can be divided into guard bands to obtain the same use ratio for a four-channel multiplex system of this invention. The symbol $f_k$ designates the keying frequency. This is 96 kc. in the given example. The symbol $f_c$ designates the carrier having a frequency of 168 kc. Each channel of Fig. 6 uses equivalent symbols.

Figure 7:
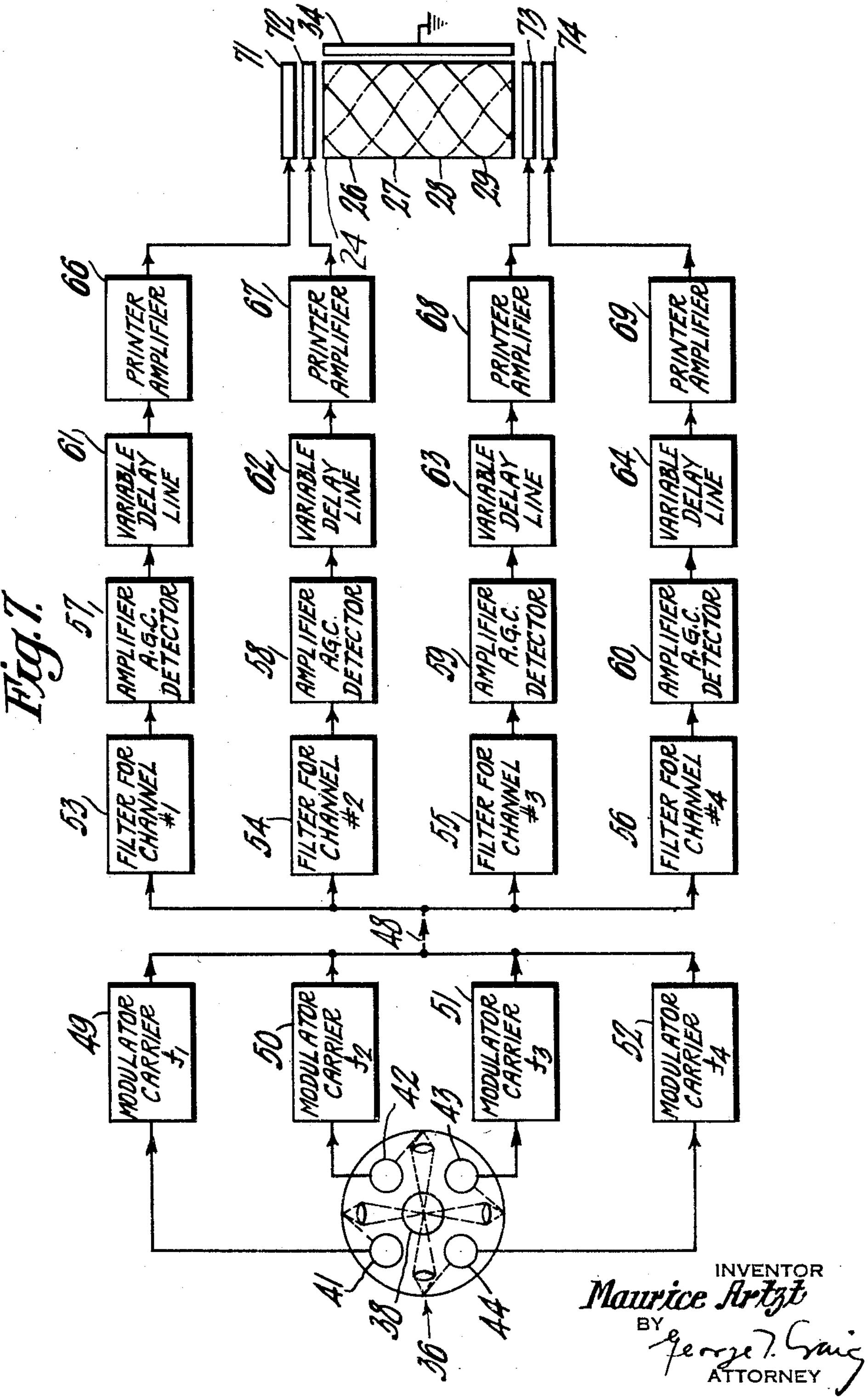
Figure 7 is a schematic showing of a system employing the recorder of Figure 3.

Fig. 7 shows schematically a four-channel multiplex.

Figure 11:
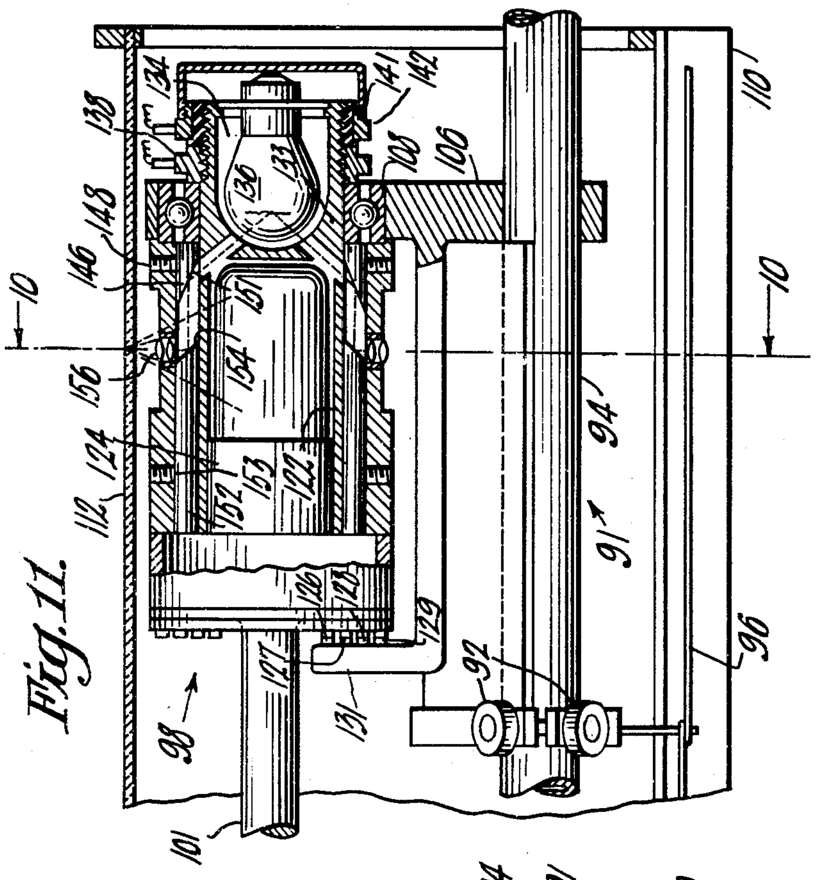
Figure 11 is a longitudinal sectional view of the scanner of Figure 10, the section being taken on line 11—11.
Figure 10:
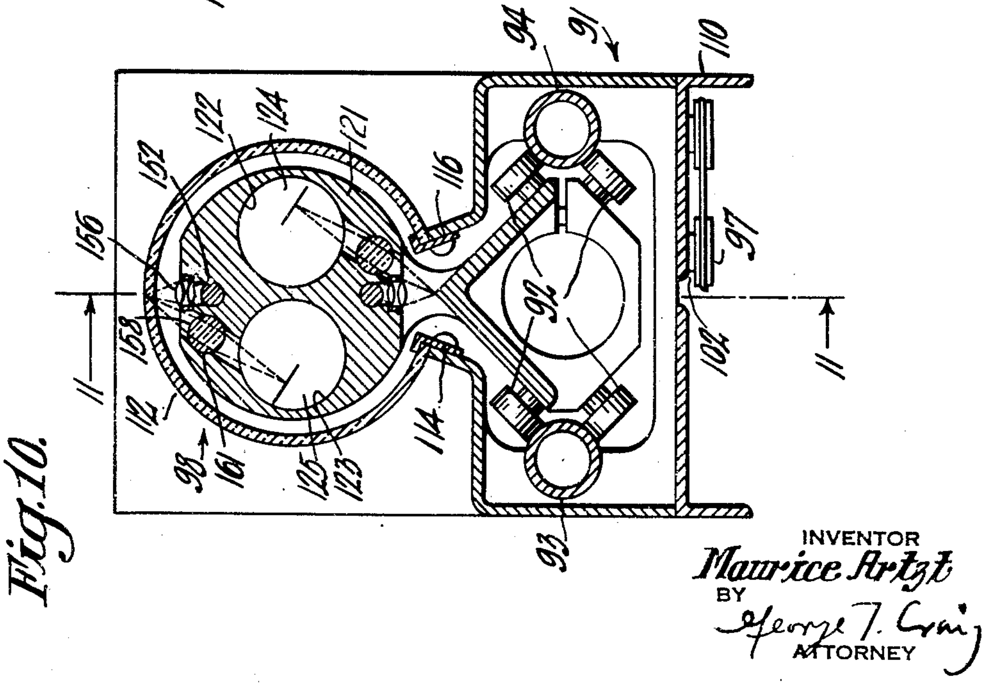
Figure 10 is a transverse sectional view of a two-channel transmitter scanner embodying the invention, the section being taken on line 10—10 in Figure 11.

Each channel is one-quarter of the width of the full band required to transmit the same image in the same time over a single channel. It will be understood by those skilled in the art that a different number of channels may be employed. The transmitter scanner 36 may be constructed as shown in Figs. 10 and 11. These latter figures show an illustrative two-channel scanner and will be described later. The scanner 36 has a common light source 38 with 4 optical paths and 4 phototubes 41 to 44. The outputs of the phototubes are used to amplitude modulate the four spaced carrier frequencies $f_1$ to $f_4$. After filtering out the upper side band of each channel, the four single side band signals are added and fed to the transmission line 48. The modulators 49 to 52 may be of any desired type.

Fig. 6 shows the relationship of the channel signals in a spectrum. The frequencies $f_1$ to $f_4$ may be 42, 90, 138 and 186 kc. The modulators may be connected to give maximum amplitude of signal on black. The band width of the single side band is 24 kc. with a total band width of 48 kc. per channel. The guard band between channels of the system is 14 kc. This 14 kc. is ample for functioning of the filters for channel signal separation. These values are given by way of example.

Figure 8:
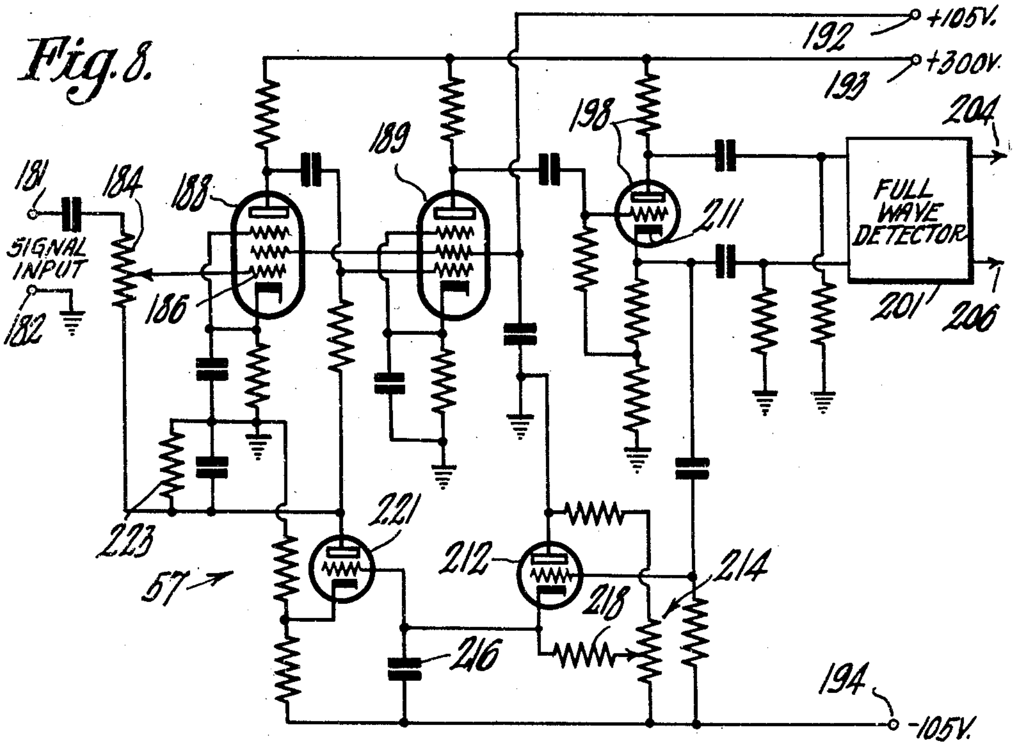
Figure 8 is a diagram of a signal amplifier embodying automatic gain control means.
Figure 9:
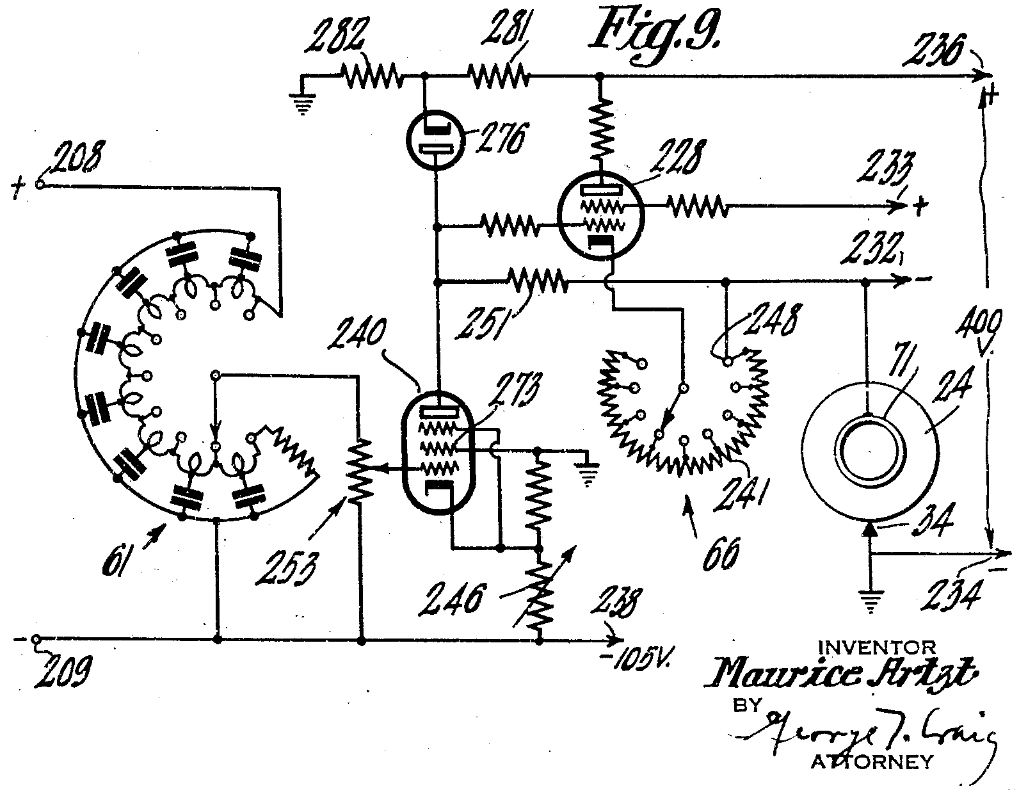
Figure 9 shows, schematically, the electrical circuit of the recorder and an associated variable delay line.

At the receiving end, the four signals are separated by filters 53 to 56. Fig. 6 of the drawing with the given description amply indicates the nature of these filters and they may be of any known type. The output of each filter is fed to an amplifier and detector combination. The amplifier portion is equipped with an automatic gain control (agc). These amplifier-detectors are designated 57 to 60 on Fig. 7. The detected output for each channel is fed to a printer amplifier through a variable delay line. The latter are designated 61 to 64 on Fig. 7. The printer amplifiers are designated 66 to 69. Fig. 8 shows one of the amplifier-detectors 57 to 60. Fig. 9 shows one of the variable delay lines 61 to 64, and, also, one of the amplifiers 66 to 69. Each amplifier 66 to 69 is connected to one of the helices 26 to 29 on the drum 24 of the recorder (Figs. 3 and 7) by way of slip rings 71 to 74. These slip rings may be radially disposed on an insulating plate in a well-known manner rather than as shown on Fig. 7 for convenience. Suitable jumpers or connectors are provided between each slip ring and its associated helix.

It will be noticed that the variable delay line has been placed in the circuit after detection rather than before. This has been done so that all lines may have the same flat delay band of zero to $f_k$, and any changing of channels or filters that may be found necessary in service will not affect the delay correcting network.

The speed of recording can be cut to one-half by using only the channels of phototubes 41 and 43 and cutting the paper feed to one-half the full value. The drum speed remains the same as for four-channel operation. Under these conditions, a two-line interlace scanning pattern is obtained and a 96 kc. bandwidth used. Any one channel can be used along with paper feed reduced to ¼ full rate, and a single channel of 48 kc. bandwidth is required. Changing speed between these three values of 1, 2 or 4 times the slowest speed is thus accomplished by a gear shift on the paper feed and by switching in or out the necessary channels. Change speed gear drives are by now well known and need not be shown. Drum speed remains constant so synchronizing and phasing are unaffected by speed changing.

The illustrative two-channel scanner of Figs. 10 and 11 was mentioned above in connection with the four-channel scanner 36 of Fig. 7. Referring to Figs. 10 and 11, the scanner comprises a carriage 91 equipped with rollers 92. The latter roll on a trackway provided by tubular rails 93 and 94. The carriage is moved along the rails to provide one component of scanning action by means of a cord 96 and a driven reel 97. Reel drives are known in the art which coordinate the rotational speed of the scanning head 98 with its desired rate of axial travel. For example, a worm pinion (not shown) on the drive shaft 101 for the scanner may mesh with a worm wheel (not shown) on the reel shaft 102. The shaft 101 is coupled to a motor (not shown) which is preferably of the constant speed type. A synchronous motor may be used. Any known or desired synchronizing system may be employed to keep the recorder driven in step with the scanning head 98. Sync and phasing signals may be obtained by a commutator (not shown). The gap in the subject copy may also be used to provide a sync and phasing signal. A bracket 106 on the carriage 91 carries a ball bearing assembly 108 which supports one end of the head 98. The other end is supported in a suitable bearing and extensible drive connection (not shown).

A stationary housing or frame 110 provides support for a transparent cylindrical member 112 which surrounds the head 98. Subject copy is wrapped around the member 112 from one support 114 to the other 116. The gap between supports may provide the sync and phasing signal as indicated above. In addition to providing support for the cylindrical copy holder 112, the housing or frame 110 also supports the motor and the additional bearing, mentioned above, for the shaft 101.

The scanning head 98 comprises a body member 121 which may be cast or otherwise formed of aluminum, for example. The body 121 is provided with cylindrical bores or apertures 122 and 123. These bores accommodate phototubes 124 and 125 or similar devices to generate image signals as the subject matter on the copy holder 112 is scanned. Slip rings 126 to 129 have suitable connections to the phototubes and cooperate with brushes mounted on a carriage bracket 131. The use of a carbon brush on a silver slip ring does not introduce noise.

The body member 121 has an extended portion 133 with a chamber 134 to accommodate a lamp 136. A slip ring 138 for the lamp is threaded onto the extension 133. An insulating collar 141 is also threaded onto the extension and carries a second slip ring 142. A rod 146 is clamped in a bore in the member 121 by means of a set screw 148. Loosening of the screw permits the rod 146 to be rotated and moved axially. The rod 146 has a flat mirror surface 151 at its end. Another rod 152 is also seated in the bore and is clamped by a set screw 153. This second rod is provided with a mirror end 154. Light from the exciting lamp 136 goes through a passage in the body 121, impinges on the mirror 151 and is reflected from the mirror 154 through a lens system 156 onto the subject copy as a spot image. Light from the spot on the copy goes through the passage 158, a Lucite rod 161 serving as a cylindrical lens to the active element of the phototube 125. This structure is duplicated for the phototube 124 but displaced 180°. It will be understood that details of the structure just described may be employed in the schematic arrangement indicated on Fig. 7.

Fig. 8 showing details of the gain control amplifier 57 of Fig. 7 will now be described in detail. The units 58 to 60 are similar. Input to the amplifier 57 is applied to terminals 181 and 182. A volume or gain control 184 serves to couple the input to the control grid 186 of an amplifier tube 188. The tube 188 and a tube 189 act as amplifiers, with the necessary grid and plate resistors and coupling capacitors of such values that amplification is linear up to about 300 kc. A power supply (not shown) is connected as indicated to the terminals 192, 193 and 194. The tubes 188, 189 and a phase inverter tube 198 are connected between positive supply terminals of the power supply and ground. The push-pull signal from the output of the phase inverter tube 198 is rectified by a full-wave rectifier 201. The output of the rectifier or detector 201 appears at terminals 204 and 206 and is to be applied to the terminals 208 and 209 in Fig. 9. A portion of the signal from the cathode 211 of the tube 198 is rectified by a tube 212 serving as a cathode follower type of rectifier. The threshold setting is adjustable by a potentiometer 214. The cathode follower action of the tube 212 charges a condenser 216 through a very low impedance, and full voltage can be developed across the condenser 216 for signals of extremely short duration. Bleeder resistor 218 across the condenser 216 is of a high enough value that the fall in voltage across the condenser 216 is only a very few percent per scanning line of the subject copy. A tube 221 acts as an amplifier and reversing stage for the agc voltage developed across the condenser 216. The plate resistor 223 of the tube 221 furnishes the control bias for the amplifier tubes 188 and 189. The condenser 216 is not used for agc signal storage but is made only large enough to prevent oscillation.

With the agc just described the ratio of charge to discharge can be made as high as required, and the range of gain or voltage from no control to full bias is extremely narrow. With all of the channels of the multiplex system described herein controlled in this fashion, one channel input can suddenly be increased with respect to the other without appreciable marring of the received copy. Readjustment is also sufficiently rapid.

In addition to having an agc system, the second requirement of the recording system is that the output printer stage be a true constant current device, with the values of current for any shade of gray the same for all output stages. If this condition is not met, printer currents for the various scanning lines will be sufficiently different as bar pressure varies to give a noticeable non-uniformity of scanning line pattern. The chemical action of recording has a linear curve of density vs. printer current (log scale), but the impedance of the recording contact varies over wide limits, decreasing as current increases. This contact resistance also is affected to some extent by bar pressure, so slight mechanical irregularities in pressure would change the printing current if the printer stage were not of a constant current type.

A printer amplifier that meets these requirements is shown in Fig. 9. The printer load, represented by a helix and the printer bar, is connected in the cathode circuit of a tube 228 to get the proper polarity of input to helix and bar for recording on the front of the paper. The signal polarity is indicated on the drawing. Three 807 type tubes in parallel can be used for the tube 228. When the tube 228 is connected as shown its screen must be supplied by a separate floating 250 volt power supply to maintain a true constant current action of the output stage. This supply (not shown) is connected between terminals 232 and 233. The power supply (not shown) for the tube 228 is connected between the terminals 234, or ground, and 236. The negative terminal of the power supply or an additional power supply (not shown) is connected to terminal 238. This serves the tube 240. The peak value of the output current is regulated by the value of the cathode resistor 241. In order that all printer stages may be set to the same peak black current, this resistor is tapped rather than made smoothly variable. When the peak current of each channel is adjusted by the black trimmer 246 to a desired current value for the tap 248, all other taps will accurately give the specified currents over widely varying printer bar and helix contact resistances. This was found to hold true with variations in the height of the two helices as high as .005 inch so manufacturing tolerances on the multihelix drum are not excessively severe.

Due to the degenerative action of the resistor 241 being in plate, screen and grid circuits, this method of current control does not alter the value of signal voltage necessary across a resistor 251 to bias the output stage to cut off for white. The rectified signal input shown is held constant by the agc, and, therefore, the volume control potentiometer 253 can be set for maximum white signal to just drive tube 228 to cut off, and this white condition is then held for all settings of 241. The half tone scale is therefore the same for all values of output current, and for any particular recording condition the different channels need only be set to the same tap of 241 to have a uniform scanning line pattern. The black controls can be ganged if desired.

The plate voltage of the tube 240 will vary with signal, for the voltage across the printer is added to the power supply connected to terminal 238. However, the screen 273 of the tube 240 is held fixed so its plate current through the resistor 251 is constant even though the current and impedance of the printer circuit varies. The voltage developed across the resistor 251 thus depends only on signal input to the tube 240 and a constant drive to the grid of the tube 228 is assured.

A feature of the printer amplifier of Fig. 9 is the addition of a diode 276 to limit the voltage developed across the printer. Interaction between the printers of the system take place at the end of each scanning line of each helix. The reason for this is that at the end of each helix the printer circuit is momentarily broken before the entering edge of that same helix starts the succeeding scanning line. The voltage across the printer then momentarily rises to the full value of the plate supply across terminals 233 and 234. In the example, this is 400 volts. Leakage conductance across the wet paper to the other helix causes a small spot of color to be printed. If this voltage surge is limited to about 200 volts no interaction takes place, and this limiting is accomplished by the diode 276 connected between a 200 volt tap on a bleeder 281 and 282 and the grid of the tube 228. The grid of the tube 228 is prevented from rising above +200 volts, and the cathode therefore is limited to this same surge voltage. No effect is found on the printing, for the maximum printer current is developed with a little over 100 volts to the printer circuit.

The delay lines 61 to 64 are placed after the detector of the recording amplifier so that all delay lines handle the same frequency spectrum, and where low enough cutoff frequencies can be used to make the steps of the required amount. With the highest keying frequency per channel of 26 kc., lines with a cutoff frequency of 39 kc. or higher will give uniform delay over the video band. For 5 microseconds per stage, the cutoff frequency should be 63 kc., so steps of 5 microseconds can be used with no appreciable distortion. With single channel operation at high speed using a keying frequency of 96 kc., a total delay variation of 5 microseconds over the entire band is the maximum allowable. With multiplex operation as taught herein, 80 microseconds is permissible or 20 microseconds per channel. This is a net improvement of 16 to 1.

The tap switch used to vary the delay is shown in Fig. 9 connected to the volume control 253. This control must be of high resistance to avoid loading the filter at intermediate taps and disturbing its termination. The filter has some loss, and volume is decreased as the delay is increased. This is corrected by inserting the correct value of resistance in series with each low delay tap to decrease the voltage across the volume control 253 to that obtained with the full line switched in. Changing delay therefore does not affect the white volume setting, but only shifts phase.

It should be pointed out that these are flat delay lines and are used for correction of mechanical inaccuracies and/or differences in average total delay between channels. They are not intended to correct for differential delays within a channel, so the previous delay tolerances on the channels themselves must still be met by the transmission medium.

What is claimed is:

1. A multiplex facsimile system comprising a scanner having a copy holder and a plurality of spaced facsimile signal pick-up devices cooperating with said copy holder, a plurality of modulators, one for each signal pick-up device, the output of each modulator being a modulated carrier for transmission over a channel of a communication medium, each modulated carrier having a different frequency, intercoupling means to combine the outputs of said modulators for transmission over a single communication link, a filter for each channel, each filter selecting a signal modulated carrier, an amplifier connected to each filter, a detector connected to each channel amplifier, a variable delay line connected to each detector to compensate for mismatching in said system resulting from different delays in the several channels, a printer amplifier connected to each variable delay line, a recorder having a separate recording element for each channel, said elements being spaced in accordance with the spacing of said pick-up devices, means for connecting each element to its respective printer amplifier, and a common recording element cooperating with said separate recording elements.

2. A multiplex facsimile system comprising a scanner having a copy holder and a plurality of angularly spaced facsimile signal pick-up devices cooperating with said copy holder, a plurality of modulators, one for each signal pick-up device, the output of each modulator being a modulated carrier with upper and lower sidebands, means for suppressing one sideband, said carrier and remaining sideband being transmitted over a channel of a communication medium, each modulated carrier having a different frequency, means including a common coupling to combine the outputs of said modulators for transmission over a single communication link, a filter for each channel, each filter selecting a signal modulated carrier and its accompanying sideband, an amplifier connected to each filter, a detector connected to each channel amplifier, a variable delay line connected to each detector to compensate for mechanical and electrical mismatching in said system, a printer amplifier connected to each variable delay line, a recorder having a separate recording element for each channel, said elements being angularly spaced in accordance with the angular spacing of said pick-up devices, means for connecting each element to its respective printer amplifier, and a common recording element cooperating with said separate recording elements.

3. A multiplex facsimile system comprising a scanner having a copy holder and a plurality of angularly spaced facsimile signal pick-up devices cooperating with said copy holder, a plurality of modulators, one for each signal pick-up device, the output of each modulator being a modulated carrier for transmission over a channel of a communication medium, each modulated carrier having a different frequency, means intercoupling said modulators to combine the outputs of said modulators for transmission over a single communication link, a filter for each channel, each filter selecting a signal modulated carrier, an amplifier having automatic gain control means connected to each filter, a detector connected to each channel amplifier, a variable delay line connected to each detector to compensate for mismatching of the plurality of channels of said system resulting from different delays introduced by said plurality of channels, a printer amplifier connected to each variable delay line, a recorder having a separate recording element for each channel, said elements being angular spaced in accordance with the angular spacing of said pick-up devices, means for connecting each element to its respective printer amplifier, and a common recording element cooperating with separate recording elements.

4. A multiplex facsimile system comprising a scanner having a copy holder and a plurality of angularly spaced facsimile signal pick-up devices cooperating with said copy holder, a plurality of modulators, one for each signal pick-up device, the output of each modulator being a modulated carrier for transmission over a channel of a communication medium, each modulated carrier having a different frequency, a single communication link, means coupling said modulators to said single communication link to combine the outputs of said modulators for transmission over said single communication link, a filter for each channel, each filter selecting a signal modulated carrier, an amplifier connected to each filter, a detector connected to each channel amplifier, a variable delay line connected to each detector to compensate for both mechanical and electrical mismatching of the plurality of signal channels of said system, a printer amplifier connected to each variable delay line, a recorder having a rotary drum, a separate helical recording element for each channel on said drum, said elements being electrically insulated from each other, means for connecting each element to its respective printer amplifier, and a common recording element cooperating with said separate recording elements.

References Cited in the file of this patent

UNITED STATES PATENTS

| | | |
|---|---|---|
| 1,974,911 | Buecker | Sept. 25, 1934 |
| 1,990,544 | Gray | Feb. 12, 1935 |
| 2,298,911 | Young | Oct. 13, 1942 |
| 2,303,357 | Hoover | Dec. 1, 1942 |
| 2,335,180 | Goldsmith | Nov. 23, 1943 |
| 2,390,850 | Singer | Dec. 11, 1945 |
| 2,423,769 | Goldsmith | July 8, 1947 |
| 2,529,978 | Thompson | Nov. 14, 1950 |
| 2,532,799 | Young | Dec. 5, 1950 |
| 2,564,556 | Artzt | Aug. 14, 1951 |
| 2,579,475 | Curtis | Dec. 25, 1951 |
| 2,609,440 | Goldsmith | Sept. 2, 1952 |